(12) United States Patent
Hawk

(10) Patent No.: US 10,294,927 B1
(45) Date of Patent: May 21, 2019

(54) PORTABLE ELECTROMAGNETIC GYROSCOPE PROPULSION SYSTEM AND METHOD

(71) Applicant: Scott H. Hawk, Fort Worth, TX (US)

(72) Inventor: Scott H. Hawk, Fort Worth, TX (US)

( * ) Notice: Subject to any disclaimer, the term of this patent is extended or adjusted under 35 U.S.C. 154(b) by 472 days.

(21) Appl. No.: 15/096,057

(22) Filed: Apr. 11, 2016

(51) Int. Cl.
| | |
|---|---|
| *F03G 3/00* | (2006.01) |
| *B63H 19/02* | (2006.01) |
| *B63G 8/08* | (2006.01) |
| *B64D 27/24* | (2006.01) |
| *B64G 1/40* | (2006.01) |

(52) U.S. Cl.
CPC ............... *F03G 3/00* (2013.01); *B63G 8/08* (2013.01); *B63H 19/02* (2013.01); *B64D 27/24* (2013.01); *B64G 1/409* (2013.01)

(58) Field of Classification Search
CPC .. F03G 3/00; B63G 8/08; B63H 19/02; B64D 27/24; B64G 1/409
See application file for complete search history.

(56) References Cited

U.S. PATENT DOCUMENTS

| | | | | |
|---|---|---|---|---|
| 3,371,541 A | * | 3/1968 | Herman, Jr. | H02K 44/04 74/5 R |
| 3,502,342 A | * | 3/1970 | Albert | F16J 15/3404 277/306 |
| 3,516,280 A | * | 6/1970 | Bryant | G01C 19/14 74/5.43 |
| 3,831,454 A | * | 8/1974 | Hoffman | G01C 19/14 73/504.03 |
| 4,076,187 A | | 2/1978 | Metz | |
| 4,446,418 A | * | 5/1984 | Richardson | H02K 7/025 310/74 |
| 6,568,291 B1 | * | 5/2003 | Inman | B64G 1/28 244/165 |
| 7,458,329 B2 | * | 12/2008 | Nedwed | B63B 39/04 114/122 |
| 2010/0066560 A1 | * | 3/2010 | McDaniel | E21B 43/267 340/854.9 |
| 2014/0262161 A1 | * | 9/2014 | Weigand | G06F 1/203 165/104.33 |
| 2017/0253330 A1 | * | 9/2017 | Saigh | B64C 39/024 |

* cited by examiner

*Primary Examiner* — Zakaria Elahmadi
(74) *Attorney, Agent, or Firm* — Bruce A. Lev

(57) ABSTRACT

A portable electromagnetic gyroscope propulsion system for land, sea, air, underwater, submarine, and space applications. The system includes one or more dc motors each having an axial shaft and one or more disks rotatably coupled each to the axial shaft of the one or more dc motors. One or more non-metallic tubes are filled with liquid metal fluid and affixed to an outer circumferential surface of the one or more disks. A collar of each of the one or more disks attractively couples with the liquid metal fluid and creates an out-of-balance pivoting of the one or more disks.

16 Claims, 7 Drawing Sheets

- One or more DC motor 102
- One or More Disk(s) 106
- Axial Shaft(s) 108
- One or More Non-Metallic Tubes 112
- Liquid Metal Fluid 114
- An Outer Circumferential Surface 116
- Collar 118
- Device Frame 120
- Pivot Bearing 122
- Actuators 124
- Drone 126
- Mounting Ring 128
- Electromagnets 130
- User Instructions 138

PORTABLE ELECTROMAGNETIC GYROSCOPE PROPULSION SYSTEM AND METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of propulsion system and more specifically relates to portable electromagnetic gyroscope propulsion system.

2. Description of the Related Art

There is a need for a propulsion system for land, sea, air, underwater, and space that require minimal or no use of aerodynamics, jets, and/or rockets.

Various attempts have been made to solve the above-mentioned problems such as those found in U.S. Pat. and Pub. Nos. U.S. Pat. No. 6,568,291B1 to William E. Inman entitled "Shaftless Gyrostabilizer" having a gyrostabilizer without a physical shaft or axle including counter-revolving concentric rings filled with weights such as spherical balls that are propelled in an orbital fashion; U.S. Pat. No. 4,076,187A to Pierre Metz entitled "Attitude-Controlling System and a Missile Equipped with such System" controlling attitude of a cylindrical body moving in a fluid; and U.S. Pat. No. 4,446,418A to Royset L. Richardson entitled "Generator and Drive System" producing an electrical power output or for providing rotary motion for a drive system. This art is representative of propulsion systems. None of the above inventions and patents, taken either singly or in combination, is seen to describe the invention as claimed.

Ideally, a propulsion system should provide lift and, yet would operate reliably and be manufactured at a modest expense. Thus, a need exists for a reliable propulsion system to avoid all or many of the above-mentioned problems.

BRIEF SUMMARY OF THE INVENTION

In view of the foregoing disadvantages inherent in the known field of propulsion system art, the present invention provides a novel electromagnetic propulsion system. The general purpose of the present invention, which will be described subsequently in greater detail, is to provide a portable electromagnetic gyroscope propulsion system.

A portable electromagnetic gyroscope propulsion system is disclosed for land, sea, air, underwater, submarine, and space applications. The system includes: one or more dc motors each having an axial shaft and one or more disks rotatably coupled each to the axial shaft of the one or more dc motors. One or more non-metallic tubes are filled with liquid metal fluid and affixed to an outer circumferential surface of the one or more disks. A collar of each of the one or more disks attractively couples with the liquid metal fluid and creates an out-of-balance pivoting of the one or more disks.

A method is disclosed for operating a portable electromagnetic gyroscope propulsion system for land, sea, air, underwater, submarine, and space applications. The method includes the steps of: operate one or more dc motors each having an axial shaft; rotatably couple one or more disks each to the axial shaft to the one or more dc motors; rotate an outer circumferential surface of the one or more disks affixed with one or more non-metallic tubes filled with a liquid metal fluid; attractively couple a collar of each of the one or more disks with the liquid metal fluid; and create an out-of-balance pivoting of the one or more disks.

The present invention holds significant improvements and serves as a portable propulsion system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, portable electromagnetic gyroscope propulsion system constructed and operative according to the teachings of the present invention.

FIG. 7 is a kit illustrating a portable electromagnetic gyroscope propulsion system according to an embodiment of the present invention of FIG. 1.

The various embodiments of the present invention will hereinafter be described in conjunction with the appended drawings, wherein like designations denote like elements.

DETAILED DESCRIPTION

As discussed above, embodiments of the present invention relate to a propulsion system and more particularly to an electromagnetic propulsion system as used to improve lift properties of a device frame including, for example, a drone or a droid.

Generally speaking, a portable electromagnetic gyroscope propulsion system includes a dc motor having a one or more shafts that spins disks, for example, at approximately 10,000 R.P.M.s when electromagnets are activated. Metal fluid in one or more non-magnetic tubes is attracted to the one or more disks. For example, metal fluid is ferrofluid for some devices and for others mercury fluid. Out-of-balance forces, e.g., tug of war of, for example, pivoting of one or more gyroscopes attached to the device frame lift the device frame including a drone or a droid. Metal fluid remains constant in the non-metallic tube(s) except for a portion of the metal fluid of the non-metallic tube(s) activated by electromagnets in a collar.

Advantageously, to provide additional or increased lift, multiple disks would be included on a single shaft. In yet another example, additional shafts would be utilized with one or more disks to further boost and/or increase lift, e.g., forward or backward, of the device frame.

Figure 1:
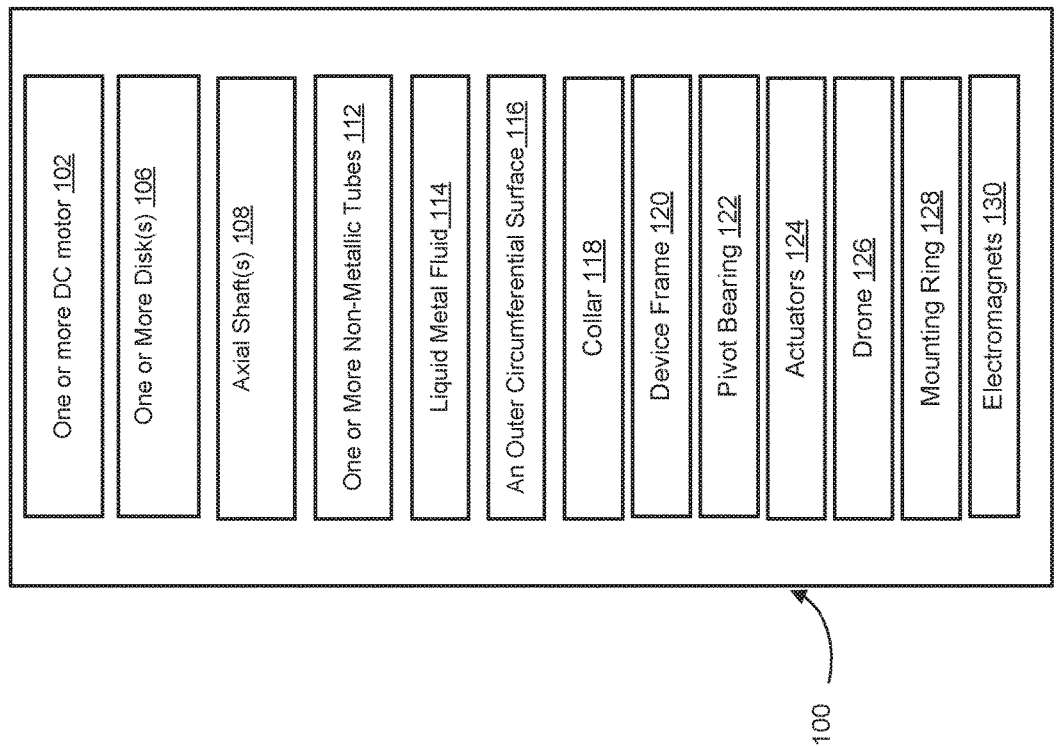
FIG. 1 shows a block diagram illustrating a portable electromagnetic gyroscope propulsion system according to an embodiment of the present invention.

FIG. 1 shows a block diagram illustrating a portable electromagnetic gyroscope propulsion system according to an embodiment of the present invention.

Referring to the drawings by numerals of reference there is shown in FIG. 1, a portable electromagnetic gyroscope propulsion system 100 is disclosed for land, sea, air, underwater, submarine, and space applications. The system 100 includes one or more dc motors 102 each having an axial shaft 104. In one example, the one or more disks 106 are rotatably coupled each to the axial shaft 108 of the one or more dc motors 102. In one example, one or more disks 106 are rotatably coupled each to its own axial shaft 108. In one example, the one or more disks 106 are rotatably coupled to one or more axial shafts 108. In another example, the one or more disks 106 have common shafts and/or one or more axial shafts 108. In some embodiments, one or more non-metallic tubes 112 are filled with liquid metal fluid 114 and affixed to an outer circumferential surface 116 of the one or more disks 106. A collar 118 of each of the one or more disks 106 attractively couples with the liquid metal fluid 114 and creates an out-of-balance pivoting of the one or more disks 106.

In some embodiments, a device frame 120 is attached to the collar 118 of each of the one or more disks 106 and an axial shaft 104 of the one or more dc motors 102 along outer edges thereof. In some embodiments, a pivot bearing 122 couples between each of the one or more dc motors 102 and the device frame 120 and operatively couples to provide the out-of-balance pivoting of the one or more disks 106.

Advantageously, the out-of-balance pivoting creates lift, for example, of the device frame 120 in a forward or reverse direction In some embodiments, one or more actuators 124 provide diagonal lift of the device frame 120. In one example, a drone or a droid 126 affixes to the device frame 120. In one example, a mounting ring 128 couples to the axial shaft 104 of the dc motor 102.

In some embodiments, electromagnets 130 dispersed about the collar 118 attract a portion of the liquid metal fluid 114 to cause the out-of-balance pivoting of the one or more disks 106. In some embodiments, the liquid metal fluid 114 remains at a constant level in the non-metallic tube(s) 112 except a portion of the liquid metal fluid of the non-metallic tube(s) 112 activated by the electromagnets 130 dispersed about the collar 118. In some embodiments, the disk 106 includes a non-magnetic material such as carbon fibers. In one example, the liquid magnetic fluid 114 includes at least one of a ferrofluid, a mercury fluid, and a metallic particle fluid.

In summary, dc motor 102 having a one or more axial shafts 108 spins disks 106, for example, at approximately 10,000 R.P.M.s when electromagnets 130 are activated to produce propulsion and lift of the frame device 120, for example, including a drone or a droid 126.

In particular, a portable electromagnetic gyroscope propulsion system is disclosed including a dc motor having a one or more shafts that spins disks. For example, dc motor spins disks approximately 10,000 R.P.M.s when electromagnets are activated. While spinning, metal fluid in one or more non-magnetic tubes is attracted to the one or more disks. For example, metal fluid is ferrofluid for some devices and for others mercury fluid.

Advantageously, in this example, out-of-balance forces, e.g., tug of war of, for example, of one or more gyroscopes attached to the device frame lift the device frame. For example, the lift of the device frame would be forward or backward. For example, the device frame would be attached to a drone or a droid. In addition, a metal fluid remains constant in the non-metallic tube(s) except for a portion of the metal fluid activated by electromagnets in a collar.

Advantageously, to provide additional or increased lift, multiple disks would be included on a single shaft. In yet another example, additional shafts would be utilized with one or more disks to further boost and/or increase lift, e.g., forward or backward, of the device frame.

Figure 2:
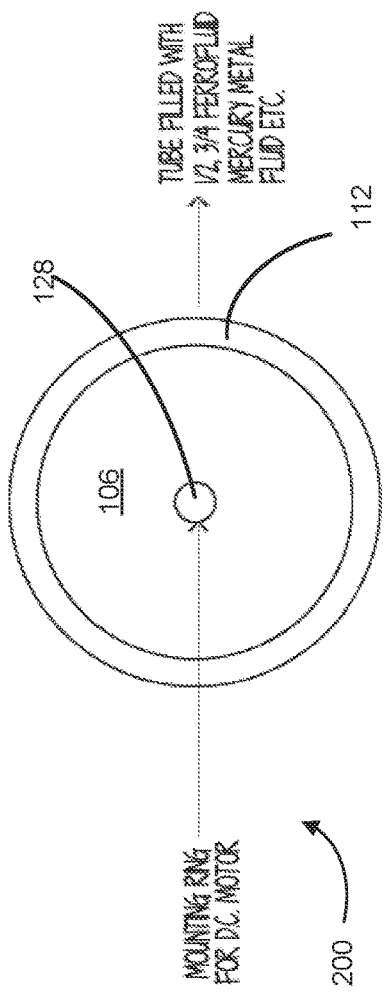
FIG. 2 is a top view illustrating a portable electromagnetic gyroscope propulsion system having a single gyroscope according to an embodiment of the present invention of FIG. 1.

FIG. 2 is a top perspective view illustrating a portable electromagnetic gyroscope propulsion system having a single gyroscope according to an embodiment of the present invention of FIG. 1.

Figure 3:
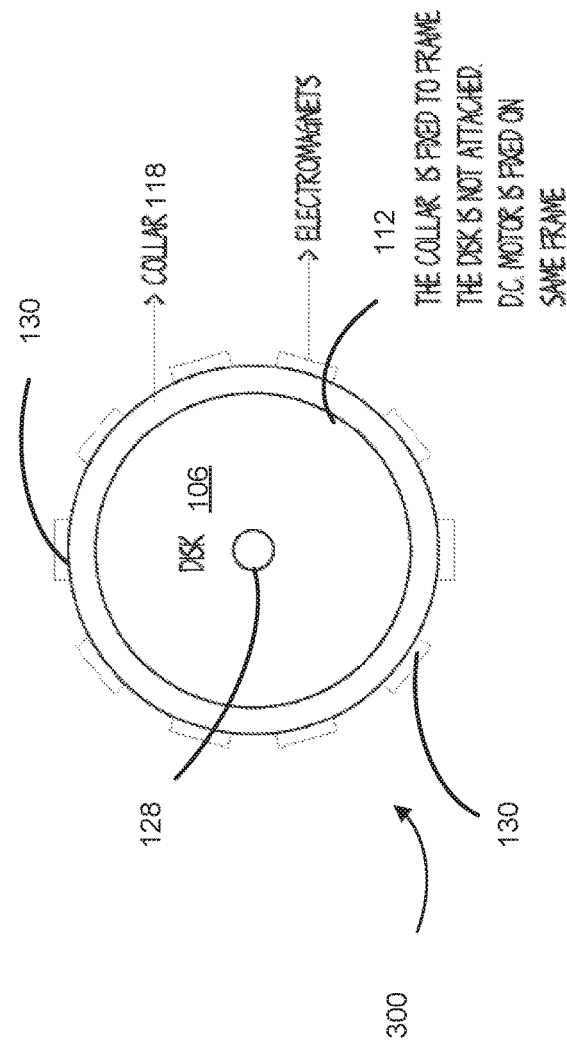
FIG. 3 is a top view illustrating a portable electromagnetic gyroscope propulsion system having a single gyroscope according to an embodiment of the present invention of FIG. 1.

FIG. 3 is a top perspective view illustrating a portable electromagnetic gyroscope propulsion system having a single gyroscope according to an embodiment of the present invention of FIG. 1.

Figure 4:
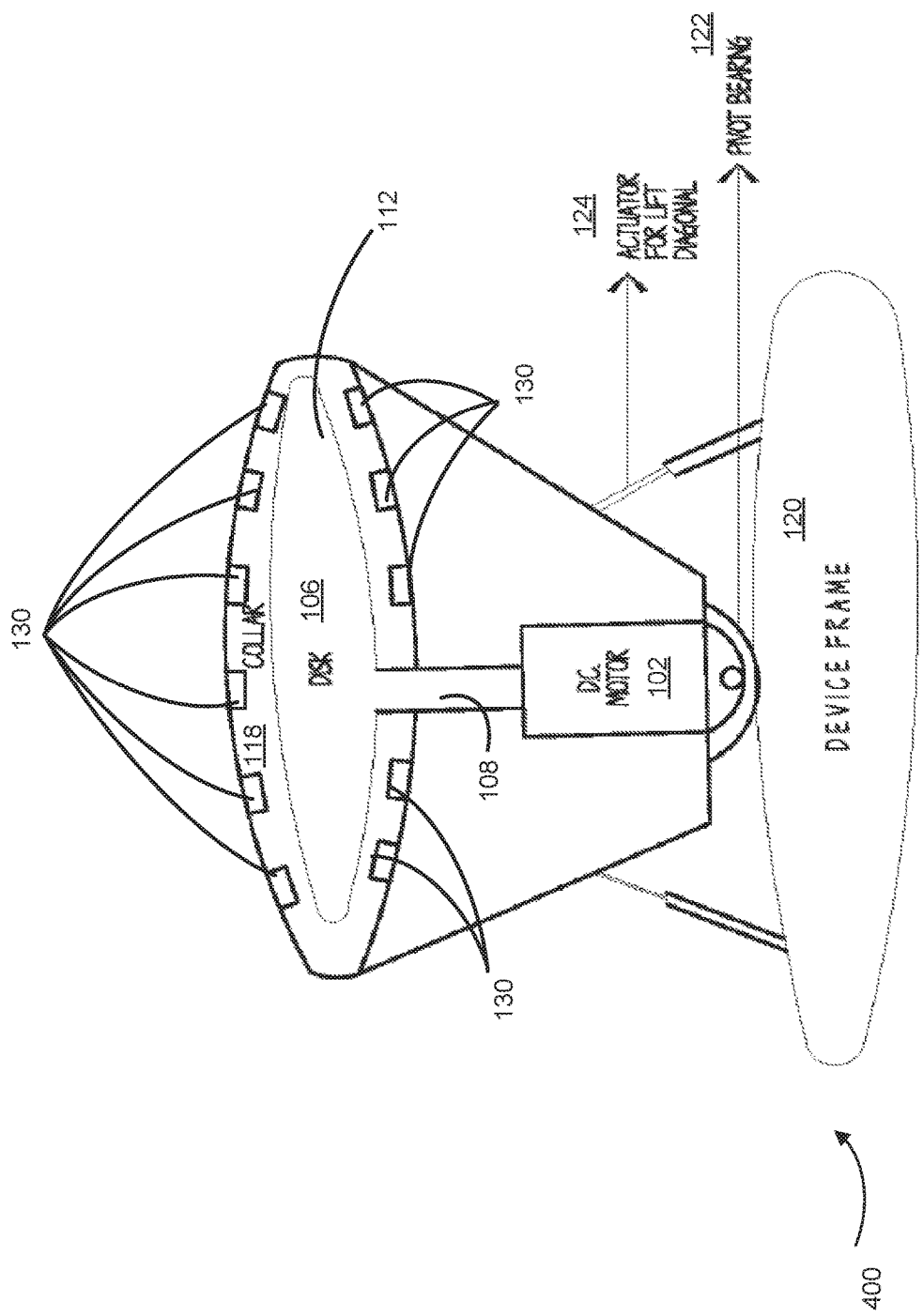
FIG. 4 is a side perspective view illustrating a portable electromagnetic gyroscope propulsion system having a single gyroscope according to an embodiment of the present invention of FIG. 1.

FIG. 4 is a side perspective view illustrating a portable electromagnetic gyroscope propulsion system having a single gyroscope according to an embodiment of the present invention of FIG. 1.

Figure 5:
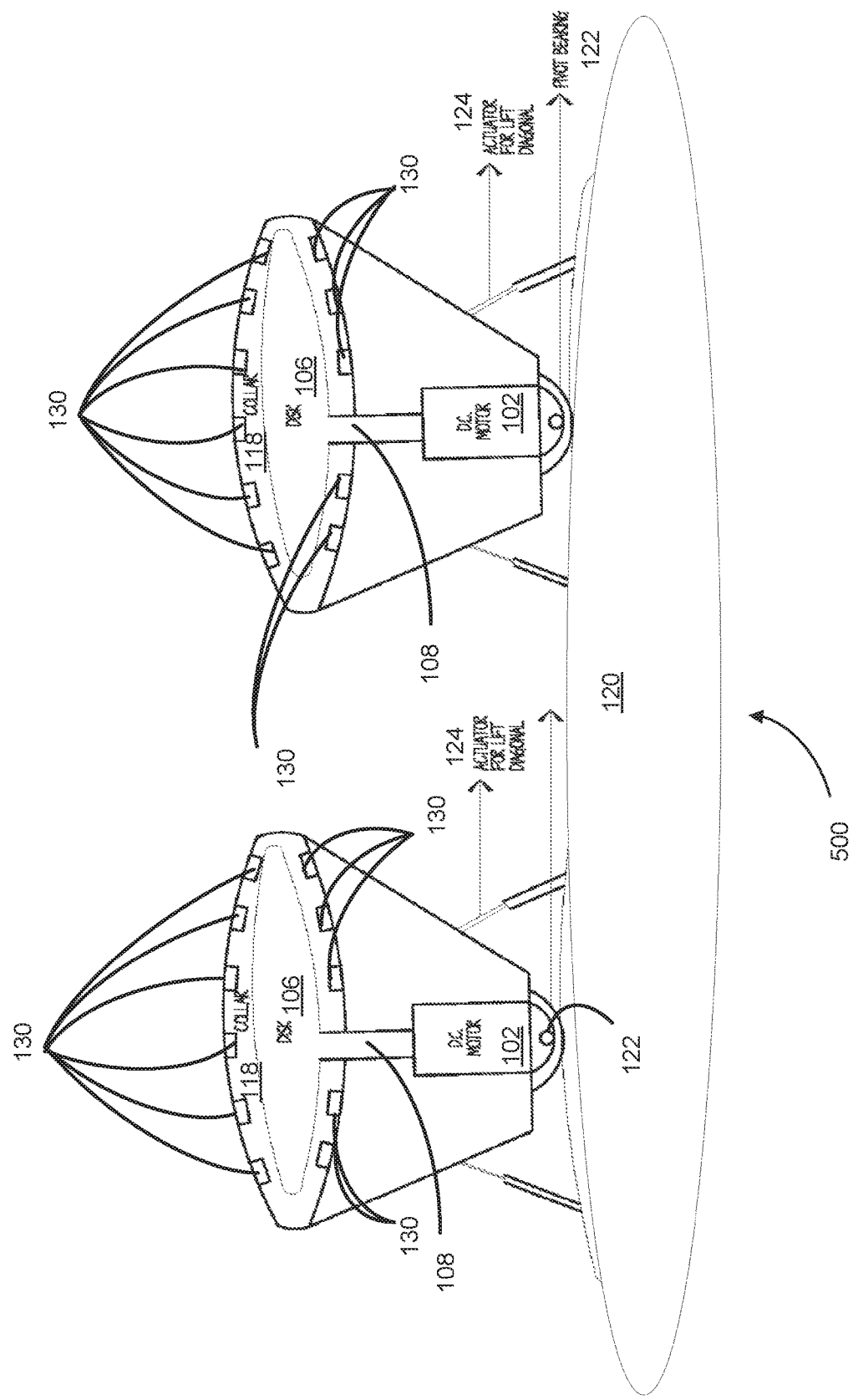
FIG. 5 is a side perspective view illustrating a portable electromagnetic gyroscope propulsion system having dual gyroscopes according to an embodiment of the present invention of FIG. 1.

FIG. 5 is a side perspective view illustrating a portable electromagnetic gyroscope propulsion system having dual gyroscopes according to an embodiment of the present invention of FIG. 1.

Figure 6:
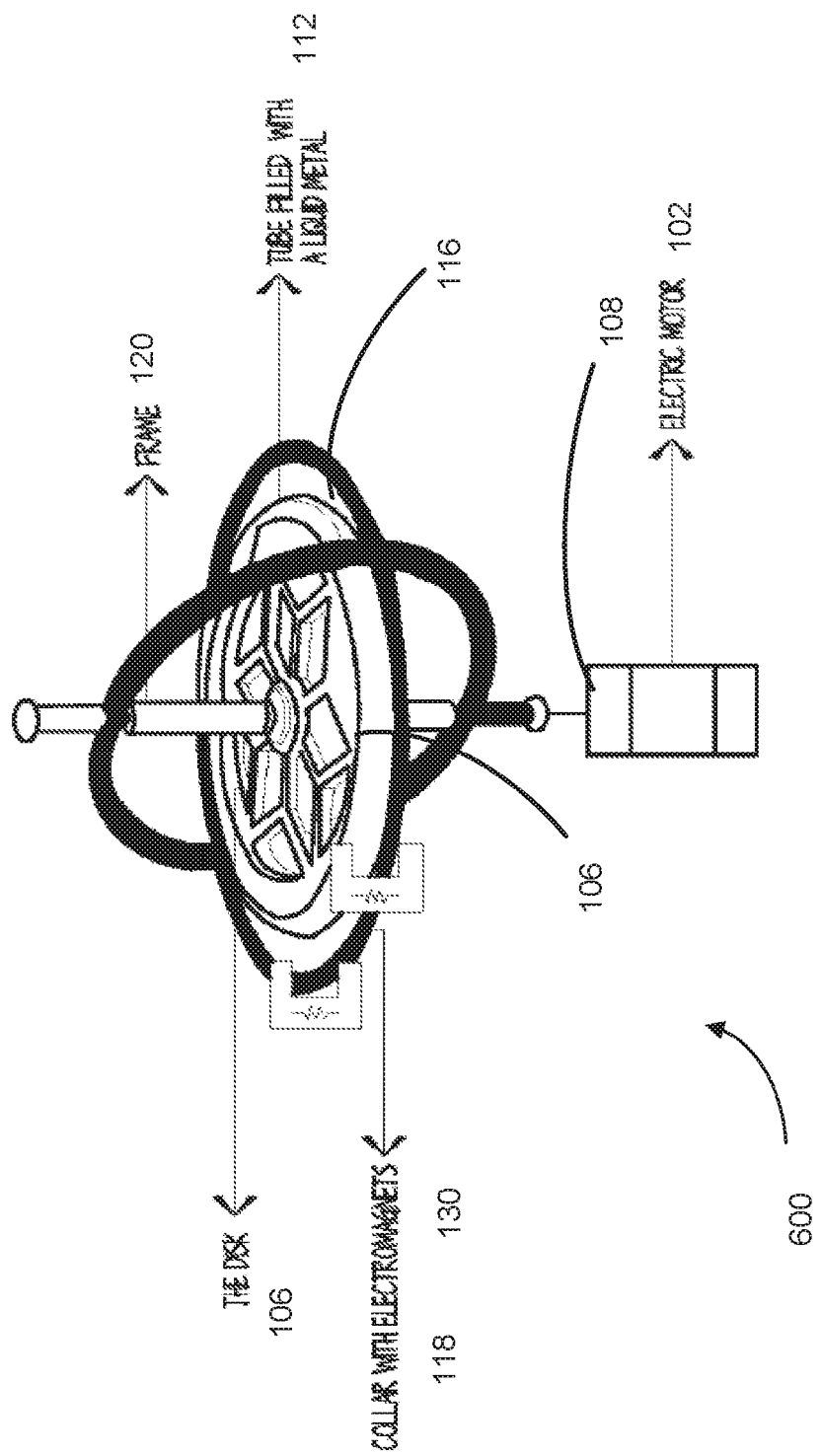
FIG. 6 is a side perspective view illustrating a portable electromagnetic gyroscope propulsion system having a single gyroscope according to an embodiment of the present invention of FIG. 1.

FIG. 6 is a side perspective view illustrating a portable electromagnetic gyroscope propulsion system having a single gyroscope according to an embodiment of the present invention of FIG. 1.

FIG. 7 is a kit illustrating a portable electromagnetic gyroscope propulsion system according to an embodiment of the present invention of FIG. 1.

Referring now to FIG. 7, showing portable electromagnetic gyroscope propulsion system 100. System 100 may be sold as kit 700 comprising the following parts: one or more dc motors 102; one or more disks 106; one or more axial shafts 108; one or more non-metallic tubes 112; one or more liquid metal fluid 114; one or more collars 118; one or more device frames 120; one or more pivot bearings 122; one or more sets of actuators 124; one or more drone or droid 126; one or more mounting ring 128; and one or more sets of electromagnets 130; and at least one set of user instructions 138. The kit has instructions such that functional relationships are detailed in relation to the structure of the invention (such that the invention can be used, maintained, or the like in a preferred manner). System 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 8:
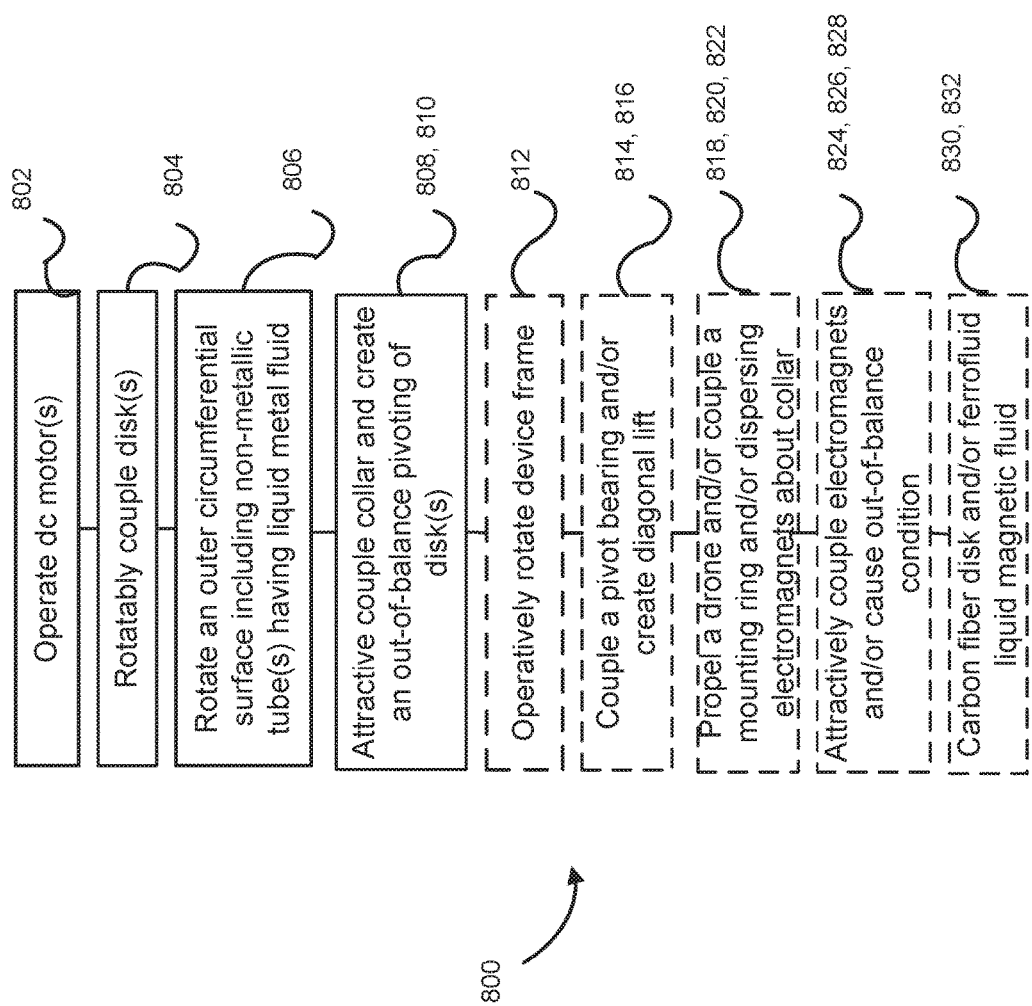
FIG. 8 is a flowchart illustrating a method of use for portable gyroscope electromagnetic propulsion system according to an embodiment of the present invention of FIGS. 1-6.

FIG. 8 is a flowchart illustrating a method of use for portable electromagnetic gyroscope propulsion system according to an embodiment of the present invention of FIGS. 1-7.

Referring now to FIG. 8, method 800 is disclosed for operating a portable propulsion electromagnetic gyroscope system 100 for land, sea, air, underwater, submarine, and space applications. In step 802, operates one or more dc motors 102 each having an axial shaft 104. In step 804, the one or more disks 106 rotatably couples each to the axial shaft to the one or more dc motors. In one alternative, rotatably couples one or more disks 106 each to its own axial shaft 108. In one alternative of step 804, one or more disks 106 would have common shafts and/or one or more axial shafts 108. In step 806, rotates an outer circumferential surface 116 of the one or more disks 106 affixed with one or more non-metallic tubes 112 filled with liquid metal fluid 114. In step 808, attractively couples a collar 118 of each of the one or more disks 106 with the liquid metal fluid 114. In step 810, creates an out-of-balance pivoting of the one or more disks 106.

In step 812, operatively rotate a device frame 120 attached to the collar 118 of each of the one or more disks 106 and an axial shaft 108 of the one or more dc motors 102 along outer edges thereof. In step 814, couple a pivot bearing 122 between each of the one or more dc motors 102 and the device frame 120; and couple operatively to provide the out-of-balance of the one or more disks 106. In step 816, create diagonal lift by one or more actuators 124 attached to the device frame 120.

Advantageously, the out-of-balance pivoting of the one or more disks 106, for example, creates forward or reverse motion of the device frame 120 attached to a drone or a droid 126.

In step 818, propel a drone or a droid 126 affixed to the device frame 120. In step 820, couple a mounting ring to the axial shaft 108 of the dc motor 102. In step 822, dispersing electromagnets 130 about the collar 118. In step 824, attractively couple a portion of the liquid metal fluid 114 with the electromagnets 130. In step 826, cause the out-of-balance pivoting of the one or more disks 106. In step 828, maintain a constant level of the liquid metal fluid 114 in the one or more non-metallic tubes 112 except a portion of the liquid metal fluid 114 of the one or more non-metallic tubes activated by the electromagnets 130 dispersed about the collar 118. In step 830, the disk 106 includes a non-magnetic material including carbon fibers. In step 832, the liquid magnetic fluid 118 includes at least one of a ferrofluid, a mercury fluid, and a metallic particle fluid.

Advantageously, dc motor 102 having a one or more axial shafts 108 that spins disks 106, for example, at approximately 10,000 R.P.M.s when electromagnets 130 are activated to produce propulsion and lift of the frame device 120.

It should be noted that step(s) 812-832 is/are optional step(s) and may not be implemented in all cases. Optional steps of method 800 are illustrated using dotted lines in FIG. 8 so as to distinguish them from the other steps of method 800.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Upon reading this specification, it should be appreciated that, under appropriate circumstances, considering such issues as user preferences, design preference, structural requirements, marketing preferences, cost, available materials, technological advances, etc., other portable propulsion system arrangements such as, for example, portable electromagnetic gyroscope propulsion system, etc., may be sufficient.

Those with ordinary skill in the art will now appreciate that upon reading this specification and by their understanding the art of portable electromagnetic gyroscope propulsion system as described herein, methods of portable electromagnetic gyroscope propulsion system will be understood by those knowledgeable in such art.

What is claimed is:

1. A portable electromagnetic gyroscope propulsion system for land, sea, air, underwater, submarine, and space applications, the system comprising:
   one or more dc motors each having an axial shaft;
   one or more disks rotatably coupled each to the axial shaft of the one or more dc motors;

one or more non-metallic tubes filled with a liquid metal fluid are affixed to an outer circumferential surface of the one or more disks;

a collar of each of the one or more disks attractively couple with the liquid metal fluid and create an out-of-balance pivoting of the one or more disks; and a drone or a droid affixed to the device frame;

wherein the liquid metal fluid remains at a constant level in the one or more non-metallic tubes except a portion of the liquid metal fluid of the one or more non-metallic tubes when activated by the electromagnets dispersed about the collar.

2. The system of claim 1, comprising a device frame attached to the collar of each of the one or more disks and an axial shaft of the one or more dc motors along outer edges thereof.

3. The system of claim 1, comprising a pivot bearing coupled between each of the one or more dc motors and the device frame and operatively coupled to provide the out-of-balance pivoting of the one or more disks.

4. The system of claim 2, comprising one or more actuators for diagonal lift of the device frame.

5. The system of claim 1, comprising a mounting ring coupled to the axial shaft of the dc motor.

6. The system of claim 1, comprising electromagnets dispersed about the collar and configured to attract the liquid metal fluid and to cause the out-of-balance pivoting of the one or more disks.

7. The system of claim 1, wherein the one or more disks include a non-magnetic material including carbon fibers.

8. The system of claim 1, wherein the magnetic fluid includes at least one of a ferrofluid, a mercury fluid, and a metallic particle fluid.

9. A method for operating a portable propulsion electromagnetic gyroscope system for land, sea, air, underwater, submarine, and space applications, the method comprising:

operating one or more dc motors each having an axial shaft;

rotatably coupling one or more disks each to the axial shaft to the one or more dc motors;

rotating an outer circumferential surface of the one or more disks affixed with one or more non-metallic tubes filled with a liquid metal fluid;

attractively coupling a collar of each of the one or more disks with the liquid metal fluid;

creating an out-of-balance pivoting of the one or more disks;

propelling a drone or a droid affixed to the device frame; and maintaining a constant level of the liquid metal fluid in the one or more non-metallic tubes except for a portion of the liquid metal fluid of the one or more non-metallic tubes activated by the electromagnets dispersed about the collar.

10. The method of claim 9, comprising operatively rotating a device frame attached to the collar of each of the one or more disks and an axial shaft of the one or more dc motors along outer edges thereof.

11. The method of claim 9, comprising coupling a pivot bearing between each of the one or more dc motors and the device frame; and coupling operatively to provide the out-of-balance pivoting of the one or more disks.

12. The method of claim 10, comprising creating a diagonal lift by one or more actuators attached to the device frame.

13. The method of claim 9, comprising coupling a mounting ring to the axial shaft of the dc motor.

14. The method of claim 9, comprising dispersing electromagnets about the collar; attractively coupling the electromagnets to a portion of the liquid metal fluid; and causing the out-of-balance pivoting of the one or more disks.

15. The method of claim 9, wherein the one or more disks include a non-magnetic material including carbon fibers.

16. The method of claim 9, wherein the magnetic fluid includes at least one of a ferrofluid, a mercury fluid, and a metallic particle fluid.

* * * * *